United States Patent [19]
VanDeMoere

[11] Patent Number: 5,220,372
[45] Date of Patent: Jun. 15, 1993

[54] CAMERA VIEWFINDER

[75] Inventor: Alan V. VanDeMoere, Rochester, N.Y.

[73] Assignee: Eastman Kodak Company, Rochester, N.Y.

[21] Appl. No.: 823,951

[22] Filed: Jan. 22, 1992

[51] Int. Cl.⁵ .............................................. G03B 13/02
[52] U.S. Cl. ..................... 354/219; 354/288
[58] Field of Search .................. 354/219–225, 354/288

[56] References Cited

U.S. PATENT DOCUMENTS

| | | | |
|---|---|---|---|
| 3,631,783 | 1/1972 | Jones | 354/288 X |
| 3,731,586 | 5/1973 | Meazza | 354/219 X |
| 3,747,492 | 7/1973 | Penick | 354/288 X |
| 4,268,150 | 5/1981 | Chen | 354/206 |
| 4,742,366 | 5/1988 | Nakazawa | 354/204 |
| 4,751,536 | 6/1988 | Ohmura et al. | 354/75 |
| 4,812,863 | 3/1989 | Ohmura et al. | 354/219 |

FOREIGN PATENT DOCUMENTS

| | | |
|---|---|---|
| 3804917 | 8/1988 | Fed. Rep. of Germany . |
| 6708486 | 3/1968 | Netherlands . |
| 2202056 | 9/1988 | United Kingdom . |

*Primary Examiner*—Michael L. Gellner
*Assistant Examiner*—Howard B. Blankenship
*Attorney, Agent, or Firm*—Roger A. Fields

[57] ABSTRACT

A photographic camera comprising a camera housing which has an internal viewfinder tunnel with a frame finder opening in a front wall of the housing, and a taking lens extension projecting longitudinally from the front wall, is characterized in that the taking lens extension has a channel-like cut-out substantially along its length which converges rearwardly toward the frame finder opening to effectively extend the viewfinder tunnel to facilitate aiming the photographic camera.

8 Claims, 3 Drawing Sheets

CAMERA VIEWFINDER

BACKGROUND OF THE INVENTION

1. Field of the Invention

The invention relates generally to the field of photography, and in particular to a camera viewfinder.

2. Description of the Prior Art

It is well known to use an extension tube with a photographic camera. The extension tube is a rigid tube of specific length threaded at a front or forward end to take the camera lens and at a rear end to screw into a mount opening in a front wall of the camera body. Owing to its specific length, the extension tube is used to increase the working separation between the camera lens and the sensitive film to give a magnified image of the subject being photographed.

Typically, when aiming the photographic camera at the subject, one place's an eye at a viewing opening in a rear wall of the camera body, looks through an internal viewfinder tunnel, and out a frame finder opening in a front wall of the camera body. A problem, however, is that the extension tube may crop the frame area visible through the viewfinder tunnel, making it difficult to properly compose the subject.

SUMMARY OF THE INVENTION

According to the invention, a photographic camera comprising a camera housing which has an internal viewfinder tunnel with a frame finder opening in a front wall of the housing, and a taking lens extension projecting longitudinally from the front wall, is characterized in that:

said taking lens extension has a channel-like cut-out substantially along its length which converges toward the frame finder opening to effectively extend the viewfinder tunnel to facilitate aiming the photographic camera.

DETAILED DESCRIPTION OF THE PREFERRED EMBODIMENT

The invention is disclosed in connection with a 35 mm camera. Because such a camera is widely known, this description is directed in particular to photographic elements forming part of or cooperating directly with the invention. It is to be understood, however, that other elements not specifically shown or described may take various forms known to persons of ordinary skill in the art.

Figure 1:
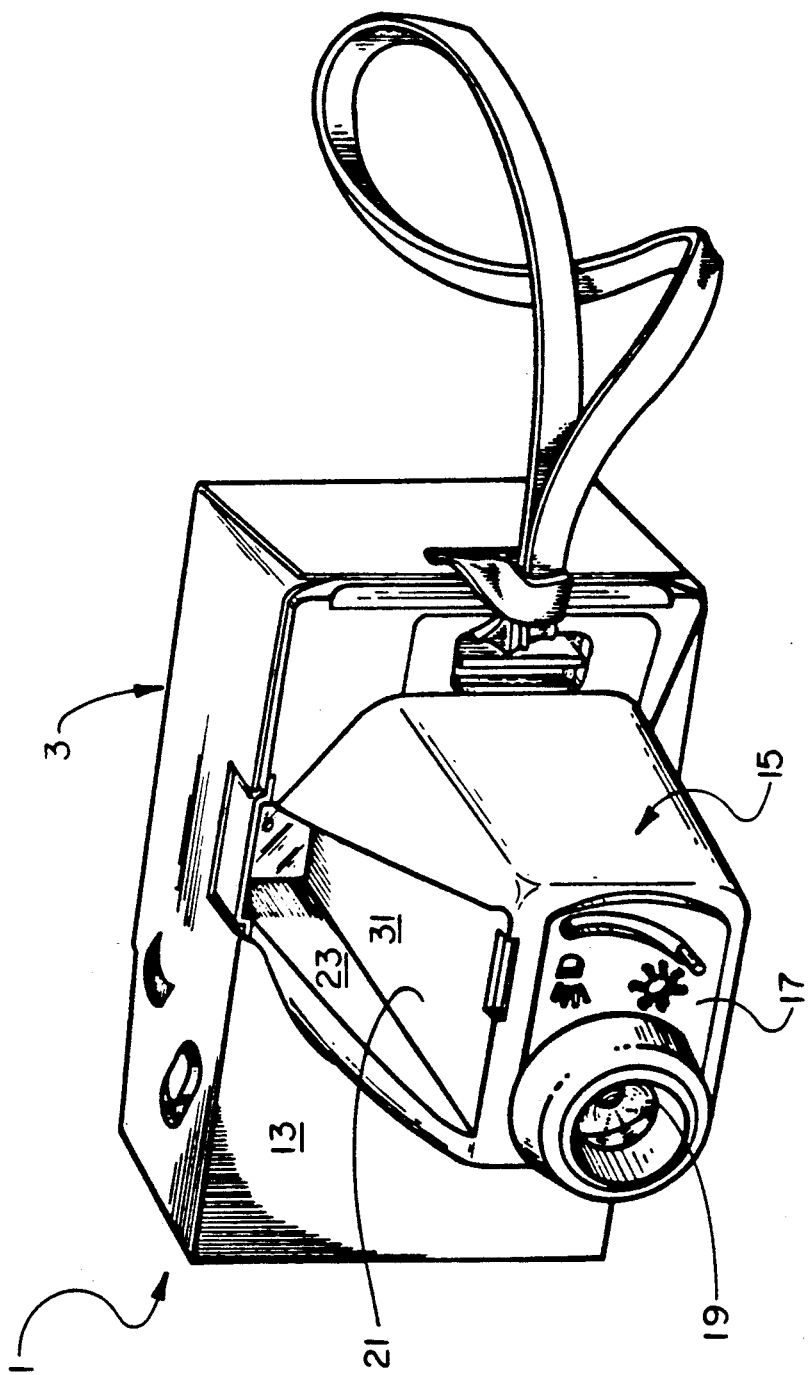
FIG. 1 is a front perspective view of a photographic camera including a viewfinder construction according to a preferred embodiment of the invention.
Figure 3:
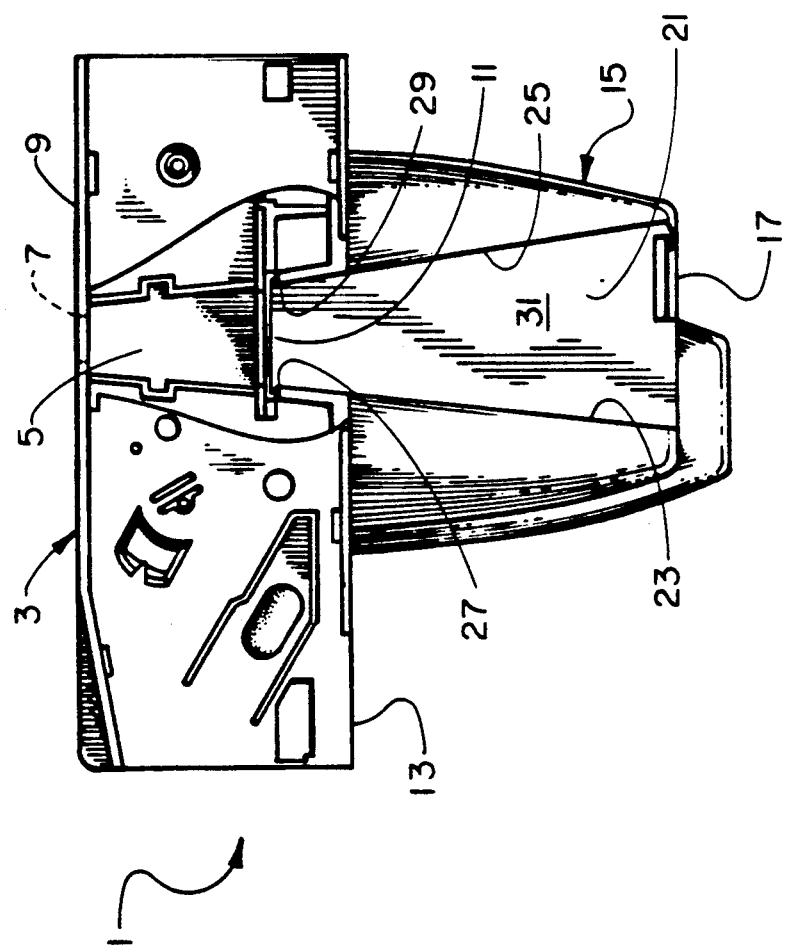
FIG. 3 is a top view of the photographic camera with part of its top cover removed to show the viewfinder construction.

Referring now to FIGS. 1 and 3 of the drawings there is shown a photographic camera 1 comprising a camera housing or body 3 which has an internal viewfinder tunnel 5 bounded by a viewing opening 7 in a rear wall 9 of the housing and a frame finder opening 11 in a front wall 13 of the housing. A taking lens extension or snout 15 projects longitudinally from the front wall 13 and has a front end or panel 17 that supports a lens element 19.

Typically, when aiming the photographic camera 1 at a subject to be photographed, one places an eye at the viewing opening 7, looks through the internal viewfinder tunnel 5, and out the frame finder opening 11.

Figure 2:
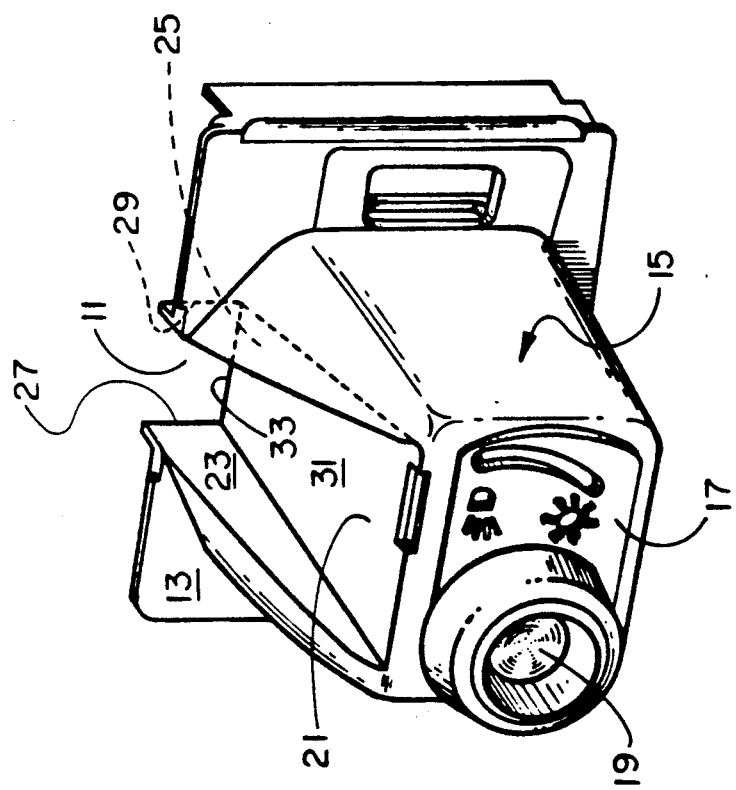
FIG. 2 is a front perspective view of an integral front wall and taking lens extension of the camera housing.

According to the invention, the taking lens extension 15 has a channel-like cut-out 21 substantially along its length which converges toward the frame finder opening 11 to effectively extend the viewfinder tunnel 5 to facilitate camera aiming. See FIGS. 1 and 3. The channel-like cut-out 21 is defined by a pair of upstanding spaced walls 23 and 25 of the taking lens extension 15 which converge from the front end 17 of the taking lens extension rearwardly to respective sides 27 and 29 of the frame finder opening 11. See FIG. 2. Also, the channel-like cut-out 21 is defined by a floor 31 which extends between the spaced walls 23 and 25 from the front end 17 of the taking lens extension rearwardly to a bottom 33 of the frame finder opening 11. The bottom. 33 of the frame finder opening 11 lies between the two sides 27 and 29 of the frame finder opening. See FIG. 2.

The invention has been described with reference to a preferred embodiment. However, it will be appreciated that variations and modifications can be effected within the ordinary skill in the art without departing from the scope of the invention.

I claim:

1. A photographic camera comprising a camera housing which has an internal viewfinder tunnel with a frame finder opening in a front wall of said housing, and a taking lens extension projecting longitudinally from said front wall, is characterized in that:

said taking lens extension has a channel-like cut-out substantially along its length which converges toward said frame finder opening to effectively extend said viewfinder tunnel to facilitate aiming said photographic camera.

2. A photographic camera as recited in claim 1, wherein said front wall of said housing and said taking lens extension are a single piece.

3. A photographic camera as recited in claim 1, wherein said taking lens extension has a pair of upstanding spaced walls substantially along its length which converge toward respective sides of said frame finder opening to partly define said channel-like cut-out.

4. A photographic camera as recited in claim 3, wherein said taking lens extension has a floor substantially along its length which extends between said spaced walls toward a bottom of said frame finder opening to partly define said channel-like cut-out.

5. A photographic camera as recited in claim 4, wherein said channel-like cut-out is entirely open except for said spaced walls and said floor.

6. A photographic camera comprising a camera housing which has an internal viewfinder tunnel with a frame finder opening in a front wall of said housing, and a taking lens extension projecting longitudinally from said front wall, is characterized in that:

said taking lens extension has a pair of upstanding spaced walls substantially along its length which converge from a front end of the taking lens extension that supports a lens element rearwardly to respective sides of said frame finder opening to effectively extend said viewfinder tunnel to facilitate aiming said photographic camera.

7. A photographic camera comprising viewfinder means for viewing a subject to be photographed, and lens extension means projecting from a camera housing for increasing the working separation between a taking lens and a sensitized film inside said camera housing, is characterized in that:

said lens extension means includes auxiliary means which converges rearwardly to said viewfinder means for effectively extending the viewfinder means to facilitate viewing the subject.

8. A photographic camera as recited in claim 7, wherein said auxiliary means includes a channel-like cut-out in said lens extension means which is shaped to permit the subject to be viewed through said cut-out.

* * * * *